Maurice P. Tixier
INVENTOR.

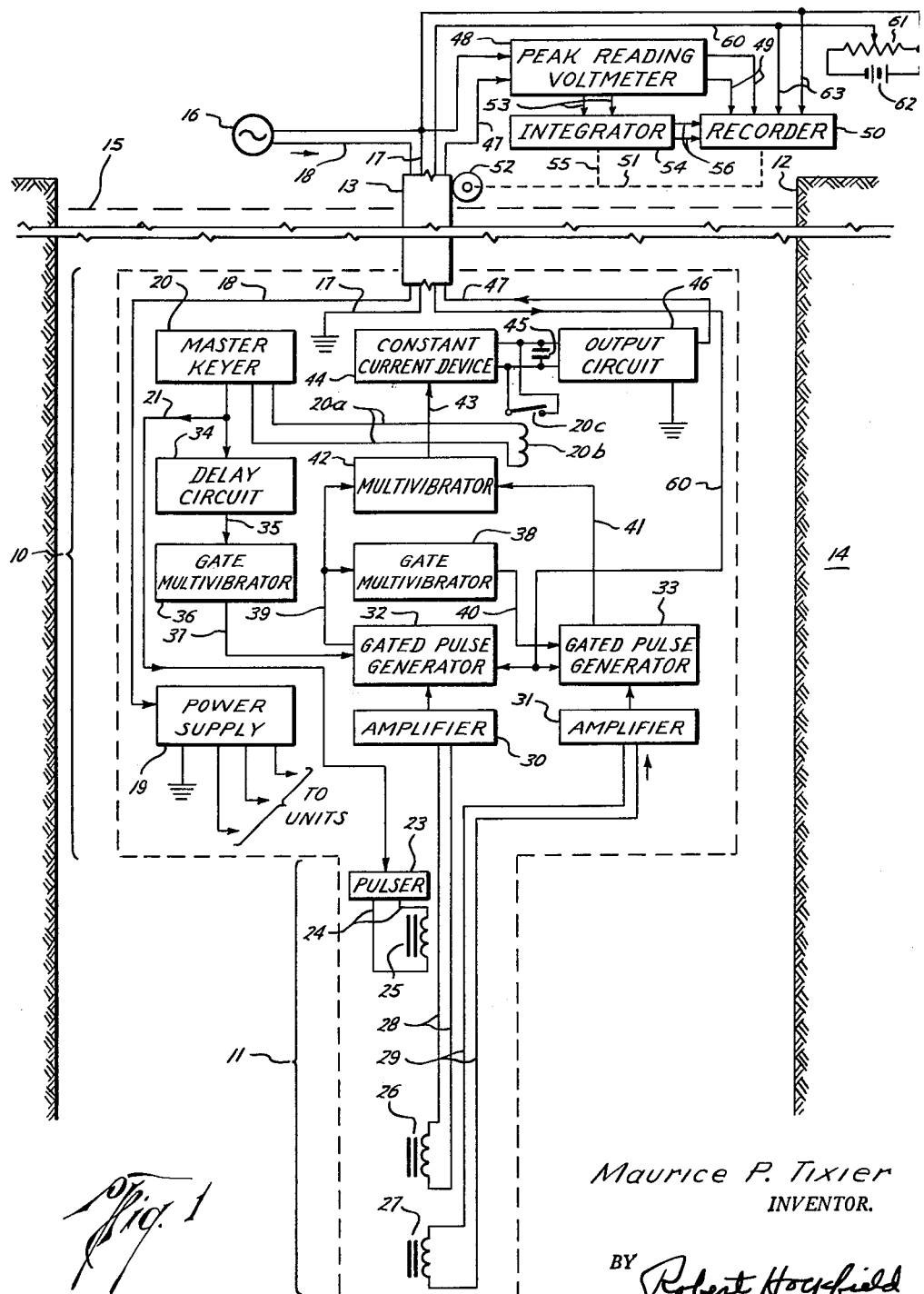

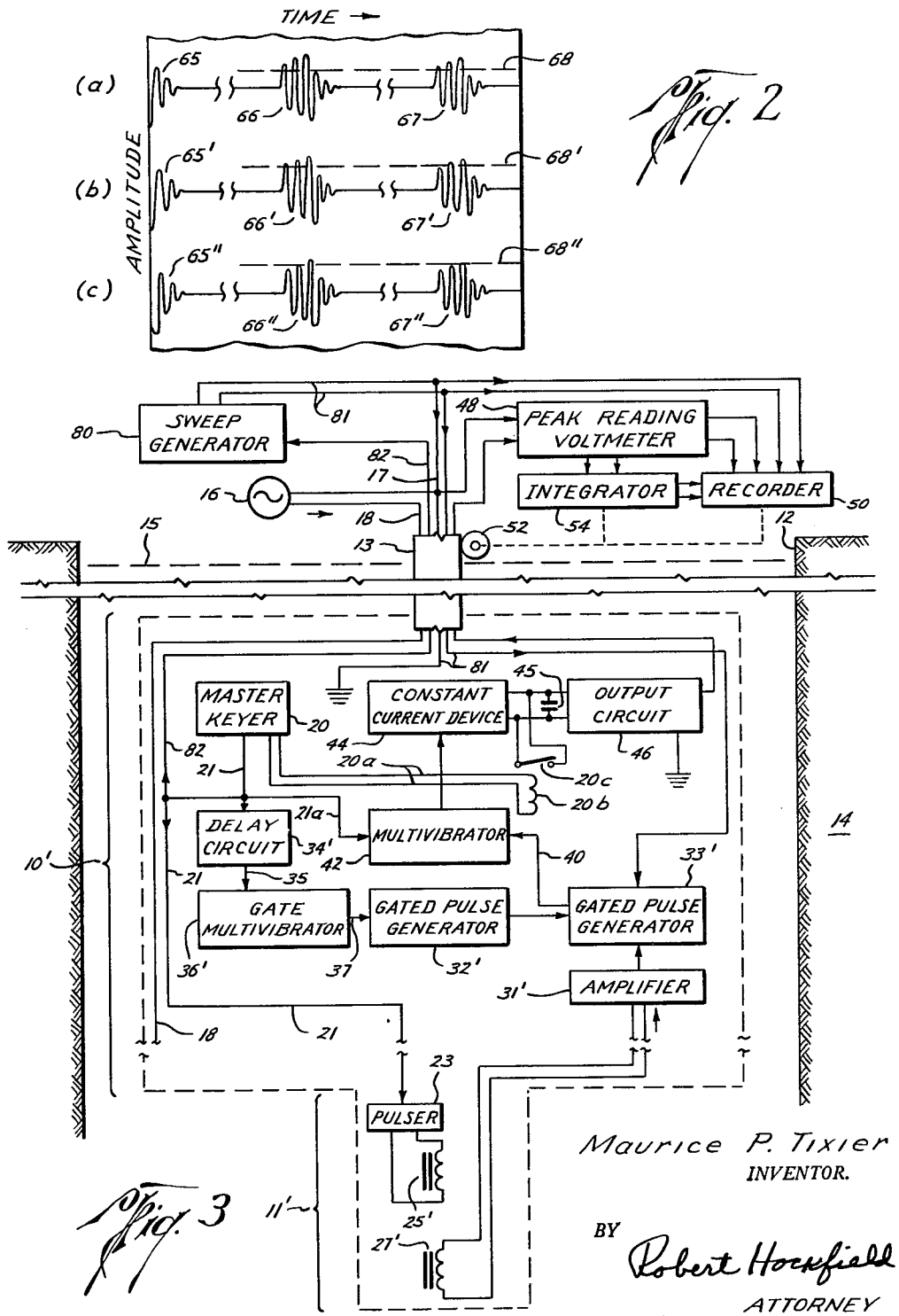

BY Robert Hockfield
ATTORNEY

United States Patent Office 3,050,150
Patented Aug. 21, 1962

3,050,150
METHODS FOR INVESTIGATING EARTH
FORMATIONS
Maurice P. Tixier, Houston, Tex., assignor to Schlumberger Well Surveying Corporation, Houston, Tex., a corporation of Texas
Filed Feb. 10, 1959, Ser. No. 792,346
17 Claims. (Cl. 181—.5)

This invention relates to methods for investigating earth formations and, more particularly, pertains to new and improved methods for determining seismic velocity and other properties of earth formations traversed by a well or borehole.

The measurement of seismic or acoustic velocity has been performed heretofore by emitting pulses of acoustic wave energy at one location in a borehole and intercepting the acoustic energy that is propagated through the adjacent earth formations and which arrives at two other locations in the borehole. The intervening time between the reception of first arrivals at the two receiving locations may then be used to provide indications related to travel time, a quantity inversely related to acoustic velocity. In general, this method has been used with considerable success and is presently gaining in commercial acceptance.

It is an object of the present invention to provide certain improvements in methods of the foregoing type.

Another object of the present invention is to provide new and improved methods for investigating earth formations through the use of which indications related to travel time of acoustic wave energy through the formations as well as other properties may be conveniently obtained.

Yet another object of the present invention is to provide new and improved methods for obtaining indications related to acoustic or seismic velocity while at the same time deriving indications related to attenuation characteristics of the adjacent earth formations.

In accordance with the present invention, to investigate earth formations traversed by a borehole, segments over a section of the bore are probed with acoustic pulses. Sensible indications of travel time are generated in response to such probing dependent upon the acoustic energy of such pulses exceeding a given value. The relationship between the given value and the emitted acoustic energy is altered and other indications are thereby generated distinguishable from the travel time indications to determine anomalies of the earth formations which are characterized by acoustic attenuation.

According to one embodiment of the invention, indications are obtained which are related to acoustic wave energy which produces in the receiving portion a signal having an intensity exceeding a given level, and this level is altered in a prescribed manner.

In another embodiment of the invention, indications are obtained which are related to acoustic wave energy which produces in the receiving portion a signal having an intensity exceeding a given level, and the intensity of the emitted energy is altered in a prescribed manner.

The novel features of the present invention are set forth with particularity in the appended claims. The present invention, both to its organization and manner of operation, together with further objects and advantages thereof, may best be understood by reference to the following description taken in connection with the accompanying drawings in which:

FIG. 1 is a schematic diagram in block form of acoustic well logging apparatus which may be employed to perform a method in accordance with one embodiment of the present invention;

FIG. 2 is a representation of certain signals useful in explaining the operation of the apparatus of FIG. 1;

FIG. 3 illustrates a modification which may be made to the apparatus shown in FIG. 1;

Figure 4:
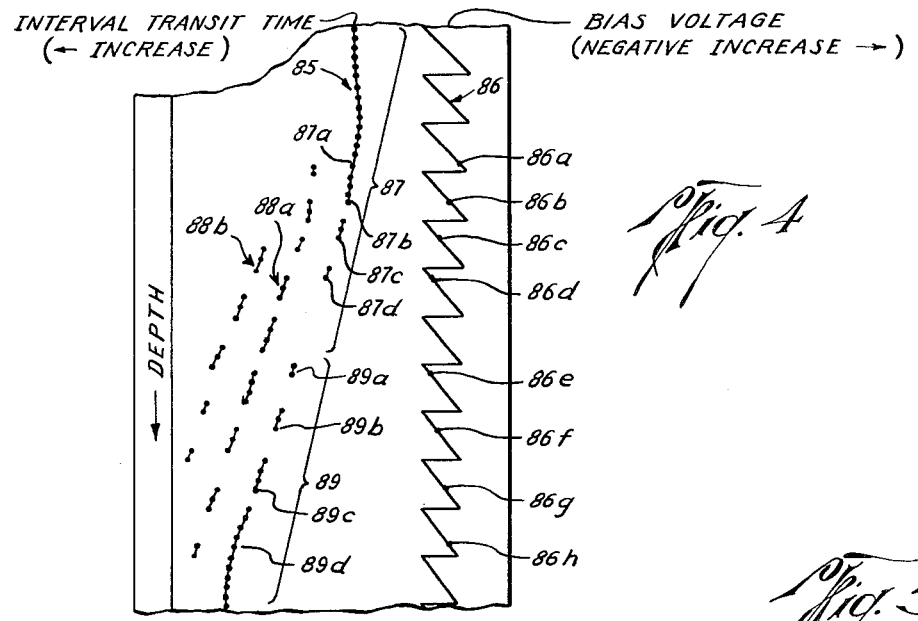
FIG. 4 is a representation of a typical record that may be obtained in the operation of the apparatus shown in FIG. 3.

In FIG. 1 of the drawings, apparatus for performing a method of investigating earth formations embodying the present invention is shown to comprise a borehole instrument including an upper, electronic section 10 and a lower transducer section 11 enclosed by appropriate pressure-tight housings capable of withstanding pressures normally encountered in the borehole 12 where the unit is suspended by means of an armored, electric cable 13. The borehole 12 penetrates earth formations 14 and by means of the cable 13 and a conventional winch (not shown) the unit 10, 11 may be passed through the borehole in order to obtain useful information concerning characteristics, such as acoustic velocity, of the earth formations 14. The borehole is filled with the usual drilling mud 15 which completes a sound transmission path between the transducer section 11 and the earth formations 14.

Electrical energy from an alternating current generator 16 at the surface of the earth is supplied via conductors 17 and 18 of cable 13 and appropriate ground connections of a conventional power supply 19 within electronic section 10. The power supply 19 converts the applied alternating current to unidirectional potentials of appropriate magnitudes for operating the various circuit elements within electronic section 10 and in section 11.

A master keyer 20 which may be a conventional free-running multivibrator or a multivibrator synchronized with the frequency of source 16 supplies repetitive master keyer pulses at 100 millisecond intervals, for example, over a conductor 21 to a conventional pulser 23. In synchronism with each applied pulse, pulser 23 supplies a pulse of high current having a duration of, for example, one microsecond over leads 24 to a transmitting transducer 25 which may be of the magnetostriction type. Preferably, both the pulser 23 and the transducer 25 are located in the upper end of transducer section 11.

To derive electrical signals in response to acoustic energy a first receiving transducer 26 and a second receiving transducer 27 are positioned below the transmitter 25 in the recited order. The receivers 26 and 27 may be of the magnetostriction type and may be spaced from one another approximately one foot. The upper received 26 may be spaced from the transmitter 25 a distance of three feet. These instances, however, may be set at any desired values. Alternatively, by using one or more additional receivers, multiple spacings may be employed on the same trip into a borehole.

The receivers 26 and 27 are coupled by leads 28 and 29 to respective pulse amplifiers 30 and 31 whose output circuits are coupled to individual gated pulse generators 32 and 33. These pulse generators are of conventional construction arranged so that no output signal is produced unless a control pulse is supplied to a control circuit.

To derive control pulses for generator 32, an extension of lead 21 from master keyer 20 is connected to the input circuit of a delay circuit 34 which provides a delay of approximately 140 microseconds. Delay circuit 34 is connected by a lead 35 to a conventional gate multivibrator 36 which generates a pulse of approximately 700 microseconds duration that is supplied via a lead 37 to the control circuit of pulse generator 32. A gate multivibrator 38 that is similar to gate multivibrator 36 has its input circuit connected by a lead 39 to the output circuit of pulse generator 32, and its output circuit is connected by a lead 40 to the control circuit of a gated pulse generator 33. The purpose of this type of connection will be more apparent from the discussion to follow.

Output lead 39 of generator 32 and output lead 41 of generator 33 are connected to respective input circuits of a conventional multivibrator 42 which provides a pulse whose duration is dependent upon the time interval between the pulses applied to its input circuit. To derive an indication of travel time, the output circuit of multivibrator 42 is connected by a lead 43 to a constant current device 44 arranged to charge a condenser 45 in its output circuit in relation to the duration of each applied pulse. Master keyer 20 is connected by leads 20a to the operating coil 20b of a relay having normally open contact 20c connected across condenser 45. The signal at leads 20a is arranged to be in the form of a pulse which begins approximately 70 milliseconds after each master keyer pulse and of 30 milliseconds in duration. Accordingly, the condenser 45 is short circuited and is thus discharged and so remains during the 30 millisecond interval preceding each emitted pulse. At the condenser 45 there thus appears a pulse signal whose amplitude is dependent upon the duration of the pulse supplied by multivibrator 42. The condenser is connected to an output circuit comprised of a conventional amplifier and cathode follower (not shown), in turn, connected by an insulated conductor 47 of cable 13 and appropriate ground connections to a conventional peak-reading voltmeter 48 at the surface of the earth. The voltmeter output is connected by leads 49 to a recorder 50 in which, through a conventional linkage 51 and a measuring wheel 52, the recording medium is transported in proportion to movement of cable 13. The voltmeter is also connected by leads 53 to an integrator 54 for integrating total travel time. This integrator may, for example, be of the ball-and-disc type in which the disc is coupled to and driven by measuring wheel 52 via a linkage 55. The position of the ball is determined in accordance with the output of peak-reading voltmeter 48. The integrator 54 may be arranged, for example, to provide an output pulse for each millisecond of travel time. The resulting pulses are applied to recorder 50 and their number when counted as a function of depth on the record represents integrated travel time.

To perform the method in accordance with one embodiment of the present invention, gated pulse generators 32 and 33 are of the type that produce output pulses only in response to the application of input pulses exceeding a given level. This may be conveniently accomplished by adjusting the bias on these generators in a conventional manner. Thus, a lead 60 extends from the surface through cable 13 to the bias-control circuits (not shown) of generators 32 and 33. The voltage on lead 60 may be adjusted by means of a potentiometer 61 connected in parallel with a battery 62. In order to obtain a record of the voltage supplied to the control circuits of generators 32 and 33 the potentiometer 61 is connected by leads 63 to recorder 50.

In operation, the unit 10, 11 is lowered in the borehole by means of cable 13 and, as it is subsequently raised, repetitive pulses are emitted from transmitting transducer 25 and propagated into adjacent earth formations 14.

The pulse on lead 21 which operates pulses 23 thereby to generate a transmitted pulse is also supplied to delay circuit 34 and 140 microseconds later a pulse triggers multivibrator 36. The multivibrator 36 provides a negative-going pulse whose leading edge is synchronized with the pulse from delay circuit 34 and whose trailing edge occurs 700 microseconds later. This control pulse is supplied over lead 37 to condition pulse generator 32 for operation. Accordingly, when the signal representing the first received pulse of acoustic energy is supplied by receiving transducer 26 to the amplifier 30, the amplified pulse causes generator 32 to generate an output pulse at lead 39. This pulse triggers multivibrator 38 and the resulting control pulse having its leading edge synchronized with the pulse from generator 32 and its trailing edge occuring 700 microseconds later, is applied over lead 40 to the control circuit of pulse generator 33. Generator 33 is thus operatively conditioned and when the signal representing acoustic energy incident upon receiving transducer 27 is translated by amplifier 31, generator 33 is triggered. The pulses from generators 32 and 33 are supplied to multivibrator 42 which generates a pulse having a duration representing the time spacing between the applied pulses. The latter pulse is supplied to constant current device 44.

Constant current device 44 causes the condenser 45 to charge linearly and this occurs for the duration of each pulse from the multivibrator 42. Accordingly, the condenser attains a charge voltage which is proportional to the duration of the applied pulse. Thirty milliseconds before the next cycle of operation begins, the pulse at leads 20a energizes coil 20b thereby closing contact 20c and the condenser is discharged. These contacts open just prior to the next cycle of operation.

It is evident that the charge voltage on condenser 45 represents the time interval between pulses received at transducers 26 and 27 and, of course, the reciprocal of this quantity represents the acoustic velocity of the adjacent earth formations. Circuit resistance across the condenser is kept to a maximum so that the condenser remains at the particular charge voltage until it is short circuited by contacts 20c. The foregoing cycle is repeated with each master keyer pulse and voltage pulses are developed at condenser 45 of amplitudes representing travel time. These pulses are supplied via the output circuit 46 and cable conductor 47 to the peak-reading voltmeter 48 and the resulting voltage is supplied to the recorder 50. Thus, a continuous log is derived representing the transit time (or acoustic velocity) of the earth formations 14.

The integrator 54 provides a series of voltage pulses whose time spacing represents the integrated values of travel time. This voltage is also supplied to recorder 50 and the two records provide extremely useful data concerning the properties of earth formations 14.

At each level in the borehole, the borehole unit 10, 11 may be halted and the method in accordance with the present invention may be carried out. For an initial reading the movable contact of potentiometer 61 is set in a position providing maximum sensitivity, i.e., establishing a minimum of negative bias on pulse generators 32 and 33 and at least one cycle is completed to provide an indication of travel time. The signal conditions for this cycle are illustrated by the waveforms (not to scale) of FIG. 2a in which the transmitted pulse consisting of a series of waves is represented by the numeral 65 and the received pulses of similar form that are fed by the amplifiers 30 and 31 to the generators 32 and 33 are denoted by the numerals 66 and 67. In this example the first positive swing in each of the pulses 66 and 67 exceeds the bias level (which although of negative polarity is represented by a broken line 68 on the upper or positive portion of the amplitude scale for convenience of explanation). Thus, the generators 32 and 33 produce pulses which actuate multivibrator 42 and constant current device 44 causes condenser 45 to develop a voltage pulse representative of travel time in the manner described hereinbefore.

The movable contact of potentiometer 61 is then displaced to another position to provide a higher negative bias as shown in FIG. 2b by broken line 68'. In response to transmitted pulse 65', received pulses 66' and 67' are fed to pulse generators 32 and 33. Although the first positive swing of pulse 66' exceeds bias level 68' thereby to actuate pulse generator 32, it is not true of pulse 67'. The first positive swing of pulse 67' is not of sufficient amplitude to actuate pulse generator 33, but the second positive swing is sufficient. Obviously, the voltage pulse developed on condenser 45 for the second cycle indicates a travel time that is appreciably longer than in the first cycle. For example, in a practical situation, the time between complete swings in the received signals was approximately 30 miscroseconds. Compared to anticipated travel times which are usually less than 200 microseconds per foot (the travel time in water) this change is quite noticeable.

Still another bias level 68'' may produce the result illustrated in FIG. 2c. Here the first positive swing in received pulse 66'' is below the bias level while the second is above it. The first and second positive swings in pulse 67'' are below the bias level while the third is above and the indicated travel time is 30 microseconds longer than in the first bias level described above.

The bias may be altered continuously from either extreme in the same direction to establish different levels for successive operating cycles. As the negative bias increases, at some value the travel time indication will show a marked increase. Obviously, a variety of conditions may be obtained; i.e., the increase may be 30 microseconds or multiples thereof. In some instances, the energy supplied by one or both of the receivers will will be insufficient to actuate either or both of the pulse generators 32 and 33 and there will be no record of travel time for such a cycle.

The above procedure may be carried out at successive depths in the borehole and at each depth, in addition to acoustic velocity data, the bias voltage at which a significant change in the indicated velocity occurs is recorded. In general, since increasing negative voltages represents decreasing sensitivities in the receiver portion of the acoustic signal path (which includes the transmitter, the receiving channels and an intervening section of the earth formations adjacent to the borehole unit 11) the voltage at which an anomaly in the travel time record occurs will be related to the attenuation of signals through the earth formations. This will depend on the formation acoustic properties and its structure, such as the presence of fractures, voids, inclusions, etc. It is thus evident that the travel time indications are affected in response to another property and valuable additional information concerning the earth formations is obtained.

Although in an operation according to the foregoing description, the borehole unit 10, 11 is maintained stationary at a given depth until a number of readings are taken while manipulating potentiometer 61, obviously the unit may be moved continuously through the borehole if the movable contact of the potentiometer is displaced quickly enough. Since master keyer 20 provides pulses at 100 millisecond intervals, a rate of speed of unit 10, 11 through the borehole on the order of 1200 feet per hour, for example, may be chosen so that there will be no appreciable change in the position of the unit 10, 11 for several successive keyer pulses. The potentiometer control may be displaced at a steady rate through its entire operation range, for instance, five times per second and returned to the starting position almost instantly. In this way, the bias level may be run through its complete range over a period of five complete operating cycles.

Automatic, rather than manual operation, may be conveniently accomplished by means of the apparatus illustrated in FIG. 3. For this purpose a sweep generator 80 provides a sawtooth wave at its output leads 81 having a repetition rate approximately one-fifth the rate of master keyer 20. Although the generator 80 may be free-running, to preserve the desired relationship between the repetition rates, an extension of lead 21 from master keyer 20 is connected to a cable conductor 82 which extends to the synchronizing circuit (not shown) of sweep generator 80. The output leads of the sweep generator are connected to recorder 50 and to the bias-control circuit (not shown) of a gated pulse generator 33'. A receiving transducer 27' is coupled to an amplifier 31', in turn, coupled to the input circuit of pulse generator 33'.

Receiving transducer 27' is included in a modified borehole unit 10', 11' which includes a transmitting transducer 25' operated by pulser 23 under the control of master keyer 20. In this arrangement the time between the emission of a pulse from transducer 25' and the reception of acoustic energy at receiving transducer 27' is measured as an indication of travel time. For this purpose, the output of master keyer 20 is supplied via lead 21 to the input circuit of delay circuit 34' which provides a delay of approximately 140 microseconds. Delay circuit 34' is connected by a lead 35 to a conventional gate multivibrator 36' which generates a pulse of approximately 700 microseconds duration that is supplied via lead 37 to the control circuit of gated pulse generator 32'. The output of the master keyer 20 is also supplied via lead 21a to an input circuit of multivibrator 42. Thus, during each operating cycle, a pulse synchronized with the transmitted pulse and a pulse synchronized with a first arrival at receiver 27' are supplied to multivibrator 42. Constant current device 44, condenser 45 and output circuit 46 operate in the same manner described in connection with FIG. 1. Thus, a signal representing travel time is supplied to peak-reading voltmeter 48 for application to recorder 50.

Over a period of five complete operating cycles of keyer 20 (each of which takes 100 milliseconds), the voltage supplied by sweep generator 80 to gated pulse generator 33' varies linearly and in the same direction and then essentially instantaneously drops to its original value. The sensitivity of the receiving portion of the signal transmission path is thus altered linearly. At some value of the applied voltage, the generator 33' responds not to the first positive swing in the received signal, but to the second. Accordingly, the pair of pulses supplied to multivibrator 42 are spaced in time by an additional 30 microseconds and an anomaly occurs in the record produced by recorder 50. The position of the anomaly on the record corresponds to the voltage from the sweep generator 80 at which it occurs.

This type of representation is shown in FIG. 4 on which the usual depth scale is greatly expanded. The output of voltmeter 48 and the voltage on leads 81 are shown as curves 85 and 86, respectively. For this example it is assumed that unit 10, 11 is passed through the borehole at a constant speed; thus curve 86 exhibits "sawtooth" undulations of uniform duration. Of course, if desired the keying rate may be synchronized with movement of unit 11, 12 through the borehole.

In the section of curve 85 designated by the numeral 87, it will be seen that the interval transit time gradually increases. There is a point, however, at which an anomaly 87a occurs at a bias 86a. Thus, the transit time indication is approximately 30 microseconds longer than in the cycle immediately preceding. In the next sweep, anomaly 87b occurs at a bias 86b which is smaller than bias 86a and in successive sweeps, anomalies 87c and 87d occur at biases 86c and 86d which are still lower. It is, therefore, evident that the attenuation of the signal travelling through the formation material exhibits an increase as a function of depth and this parameter is indicated by the various bias levels 86a–86d. Of course, the anomalies in curve 85 produce curve portions 88a and in certain sections of the formations, anomalies in curve portions 88a produce curve portions 88b at certain bias levels thus providing further information concerning earth formation characteristics.

In the section of curve 85 designated by the numeral 89, it is seen that although transit time continues to increase with depth, anomalies 89a through 89d occur at bias levels 86e through 86f which are successively lower. Thus, it may be surmised that the attenuation of signals passing through the earth formations decreases with depth in the section represented by curve section 89.

Figure 5:
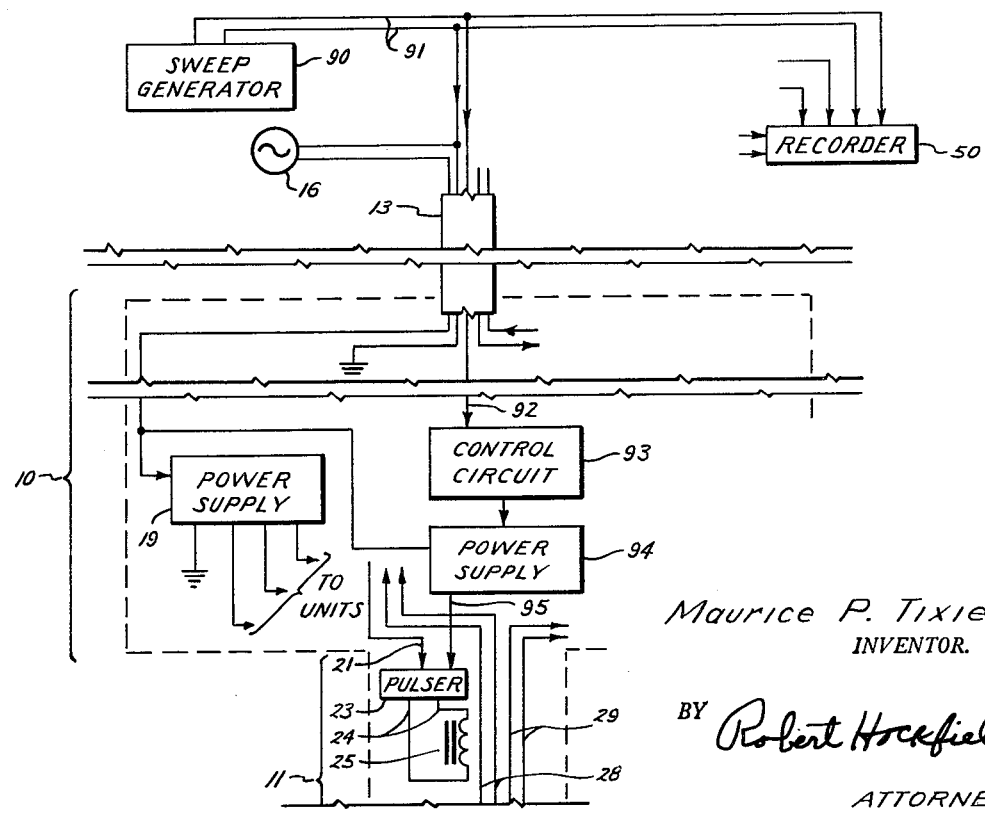
FIG. 5 represents another modification which may be made to the apparatus illustrated in FIG. 1 and which may be employed to perform a method in accordance with another embodiment of the present invention.

To alter the relationship between the bias level and the intensity of the emitted acoustic signal by changing the latter, in accordance with another embodiment of the invention, the apparatus of FIG. 1 may be modified in the manner illustrated in FIG. 5. A sweep generator 90 is employed and its output signal is supplied via leads 91 to recorder 50 and, via a cable conductor 92, to a control circuit 93 for a power supply 94. The units 93 and 94 are of conventional construction arranged to provide an output voltage which follows the signal from sweep generator 90. This output voltage is supplied over lead 95 to pulser 23 to control the operation thereof. Thus, the amount of power supplied by the pulser to the transmitting transducer 25 may be altered in accordance with the signal from generator 90.

Sweep generator 90 may be arranged to operate at a repetition rate approximately one-fifth the rate of master keyer 20 (FIG. 1). If desired, it may be synchronized with the master keyer in a manner similar to the arrangement illustrated in FIG. 2.

Over the course of several complete cycles of operation, during each of which the apparatus operates to provide indications dependent upon the travel time of acoustic wave energy through the adjacent earth formations, the intensity of acoustic wave energy that is emitted by the transmitting transducer 25 is altered continuously and in the same direction. Since the gated pulse generators 32 and 33 inherently have a given amplitude level below which they do not respond, at some intensity of emitted energy the acoustic wave energy intercepted by one of the receiving transducers 26 or 27 is such that the second, rather than the first positive swing, is of sufficient amplitude to provide an indication of travel time. It is thus evident that as in the apparatus of FIG. 1, the relationship between the bias level and intensity of the emitted acoustic signal is altered to generate sensible indications in response to another property, such as attenuation characteristics of the adjacent earth formations.

If desired, in the apparatus of FIG. 1 the control voltage from potentiometer 61 may be supplied to one instead of both of the generators 32 and 33. This may be conveniently accomplished by breaking the portion of lead 60 that extends to generator 32 so that only generator 33 is controlled.

Instead of a representation as shown in FIG. 4, other suitable arrangements may provide different forms of records. Thus, in the embodiment of FIG. 3, the output of peak-reading voltmeter 48 and the sweep voltage developed by generator 80 may be applied to a peak-reading circuit which provides a voltage representing the magnitude of the sawtooth wave at which an anomaly in curve 85 occurs. For example, an appropriate memory circuit may store the transit time information from one cycle so that it may be compared with the next in a suitable comparison circuit which provides a signal pulse if there is a change in transit time greater than a selected amount. For example, a change in transit time in a range from 10 to 50 microseconds may be employed, which particular value of 30 microseconds can be utilized for a practical arrangement where the transducer signal comprises output undulations having a period of 30 microseconds. The signal pulse may be used to cause the peak-reading voltmeter to sense the instantaneous magnitude of the sawtooth voltage and thus develop an output voltage. The latter voltage may then be supplied directly to recorder 50 to indicate attenuation characteristics of the earth formations under investigation.

From the foregoing description, it is evident that the methods embodying the present invention provide information concerning travel time characteristics of the earth formations and in addition provides indications of another property, such as attenuation. It is further evident that the method may be carried out with the usual form of acoustic velocity logging equipment by making very simple modifications.

Although it has been stated that the property of the earth formations which produces interruptions in the travel time record may be attenuation characteristics, this property alone or in combination with others may produce the indications as described. For example, gas saturation may cause an interruption in travel time indications, as may fracturing of the formations or caves or thin beds of alternate high and low velocity.

While particular embodiments of the present invention have been described, it is apparent that changes and modifications thereof may be made without departing from the invention in its broader aspects, and therefore the aim in the appended claims is to cover all such changes and modifications as fall within the true spirit and scope of the invention.

What is claimed is:

1. A method of investigating earth formations traversed by a borehole which comprises the steps of: emitting acoustic wave energy at one location in the borehole; intercepting at another location in the borehole acoustic wave energy propagated through the adjacent earth formations and arriving at said other location; generating sensible indications related to the travel time of acoustic wave energy in response to arrival of acoustic energy at said other location with an intensity exceeding a given level; and altering said level relative to the intensity of the emitted acoustic energy thereby to generate indications distinctive of said travel time indications and characterizing the acoustic attenuation property of the adjacent earth formations.

2. The method of investigating earth formations traversed by a borehole which comprises the steps of: emitting pulses of acoustic wave energy at one location in the borehole, each such pulse defining one of successive operating cycles; intercepting at another location in the borehole acoustic wave energy propagated through the adjacent earth formations and arriving at said other location; generating sensible indications during each of said operating cycles related to the travel time of acoustic wave energy in response to arrival of acoustic energy at said other location with an intensity exceeding a given level; and altering said level relative to the intensity of the emitted acoustic energy over a number of said operating cycles thereby to generate indications distinctive of said travel time indications and characterizing the acoustic attenuation property of the adjacent earth formations.

3. A method of investigating earth formations traversed by a borehole which comprises the steps of: emitting acoustic wave energy at one location in the borehole; intercepting at two other locations in the borehole acoustic wave energy propagated through the adjacent earth formations and arriving at said other locations; generating sensible indications related to the travel time of acoustic wave energy in response to arrival of acoustic energy at both of said other locations with an intensity at one of said other locations exceeding a given level; and altering said level relative to the intensity of the emitted acoustic energy thereby to generate indications distinctive of said travel time indications and characterizing the acoustic attenuation property of the adjacent earth formations.

4. A method of investigating earth formations traversed by a borehole which comprises the steps of: emitting acoustic wave energy at one location in the borehole; intercepting at another location in the borehole acoustic wave energy propagated through the adjacent earth formations and arriving at said other location; generating sensible indications related to the travel time of acoustic wave energy in response to arrival of acoustic energy at said other location with an intensity exceeding a given level; and varying said level relative to the intensity of the emitted acoustic energy thereby to generate other sensible indications in response to another property of the adjacent earth formations.

5. A method of investigating earth formations traversed by a borehole which comprises the steps of: emitting acoustic wave energy at one location in the borehole at repetitive intervals of relatively short duration thereby to define successive operating cycles; intercepting at another location in the borehole acoustic wave energy propagated through the adjacent earth formations and arriving at said other location during one of said operating cycles; generating sensible indications related to the travel time of acoustic wave energy in response to arrival of acoustic energy at said other location during one of said operating cycles with an intensity exceeding a given level relative to the intensity of the emitted acoustic energy; and altering said level to establish different values thereof for successive operating cycles thereby to generate indications distinctive of said travel time indications and characterizing the acoustic attenuation property of the adjacent earth formations.

6. A method of investigating earth formations traversed by a borehole which comprises the steps of: emitting acoustic wave energy at one location in the borehole at repetitive intervals of relatively short duration thereby to define successive operating cycles; intercepting at another location in the borehole acoustic wave energy propagated through the adjacent earth formations and developing an electrical pulse signal in response to acoustic wave energy of a given level arriving at said other location during one of said operating cycles; generating sensible indications related to said electrical pulse signal and representative of the travel time of acoustic wave energy in response to arrival of acoustic energy at said other location; and altering said level relative to the intensity of the emitted acoustic energy to establish different values thereof for successive operating cycles thereby to generate indications distinctive of said travel time indications and characterizing the acoustic attenuation property of the adjacent earth formations.

7. A method of investigating earth formations traversed by a borehole which comprises the steps of: emitting acoustic wave energy at one location in the borehole at repetitive intervals of relatively short duration thereby to define successive operating cycles; intercepting at another location in the borehole acoustic wave energy propagated through the adjacent earth formations and developing an electrical pulse signal in response to acoustic wave energy of a given level arriving at said other location during one of said operating cycles; generating sensible indications in response to said electrical pulse signal and representative of the travel time of acoustic wave energy; and altering said level relative to the intensity of the emitted acoustic energy continuously and in the same direction to establish different values thereof for successive operating cycles thereby to generate indications distinctive of said travel time indications and characterizing the acoustic attenuation property of the adjacent earth formations.

8. A method of investigating earth formations traversed by a borehole which comprises the steps of: emitting acoustic wave energy at one location in the borehole during each of repetitive intervals of relatively short duration thereby to define successive operating cycles; intercepting at another location in the borehole acoustic wave energy propagated through the adjacent earth formations and developing an electrical pulse signal in response to acoustic wave energy of a given level arriving at said other location during one of said operating cycles; generating sensible indications related to the timing relationship between said electrical pulse signal and another electrical pulse signal synchronized with the emission of acoustic wave energy thereby to obtain the travel time of acoustic energy in the adjacent earth formation; and altering said level relative to the intensity of the emitted acoustic energy continuously and in the same direction to establish different values thereof for successive operating cycles thereby to generate indications distinctive of said travel time indications and characterizing the acoustic attenuation property of the adjacent earth formations.

9. A method of investigating earth formations traversed by a borehole which comprises the steps of: emitting acoustic wave energy of controllable intensity at one location in the borehole; intercepting at another location in the borehole acoustic wave energy propagated through the adjacent earth formations and arriving at said other location; generating sensible indications related to the travel time of acoustic wave energy in response to arrival of acoustic energy at said other location with an intensity exceeding a given level; and altering the intensity of acoustic wave energy emitted from said one location relative to the intensity of the acoustic energy thereby to generate indications distinctive of said travel time indications and characterizing the acoustic attenuation property of the adjacent earth formations.

10. A method of investigating the earth formations traversed by a borehole which comprises the steps of: emitting acoustic wave energy of controllable intensity at one location in the borehole at repetitive intervals of relatively short duration thereby to define successive operating cycles; intercepting at another location in the borehole acoustic wave energy propagated through the adjacent earth formations and arriving at said other location during one of said operating cycles; generating sensible indications related to the travel time of acoustic wave energy in response to arrival of acoustic energy at said other location with an intensity exceeding a given level; and altering the intensity of acoustic wave energy emitted from said one location relative to the intensity of the acoustic energy to establish different values thereof for successive operating cycles thereby to generate indications distinctive of said travel time indications and characterizing the acoustic attenuation property of the adjacent earth formations.

11. A method of investigating the earth formations traversed by a borehole which comprises the steps of: emitting acoustic wave energy of controllable intensity at one location in the borehole at repetitive intervals of relatively short duration thereby to define successive operating cycles; intercepting at another location in the borehole acoustic wave energy propagated through the adjacent earth formations and arriving at said other location during one of said operating cycles; generating sensible indications related to the travel time of acoustic wave energy in response to arrival of acoustic energy at said other location with an intensity exceeding a given level; and altering the intensity of acoustic wave energy emitted from said one location relative to the intensity of the acoustic energy continuously and in the same direction to establish different values thereof for successive operating cycles thereby to generate indications distinctive of said travel time indications and characterizing the acoustic attenuation of the adjacent earth formations.

12. A method of investigating the earth formations traversed by a borehole which comprises the steps of: emitting acoustic wave energy of controllable intensity at one location in the borehole at repetitive intervals of relatively short duration thereby to define successive operating cycles; intercepting at another location in the borehole acoustic wave energy propagated through the adjacent earth formations and arriving at said other location during one of said operating cycles; deriving a first pulse signal synchronized with the emission of acoustic wave energy and a second pulse signal in response to acoustic wave energy arriving at said other location having an intensity exceeding a given level; generating sensible indications related to the timing relationship between said first and second pulse signals thereby to obtain the travel time of acoustic energy in the adjacent earth formations; and altering the intensity of acoustic wave energy emitted from said one location relative to said given level continuously and in the same direction to establish different values thereof for successive operating cycles thereby to generate indications distinctive of said travel time indications and characterizing the acoustic attenuation of the adjacent earth formations.

13. A method of investigating materials traversed by a well bore which comprises: probing with acoustic pulses, segments of constant length over a section of the bore, each of such pulses having a definite periodicity, generating sensible indications in response to such probing dependent upon the received acoustic energy of such pulses exceeding a given energy value, such indications having variations in time related to the acoustic velocities of materials traversed by the bore, selectively altering the relationship between the given energy value and received acoustic energy to determine the acoustic attenuation properties of the materials; and generating other sensible indications with such altered relationship to indicate attenuation of the received acoustic energy, such other indications having variations in time related to the velocities of the materials modified by a time increment factor which is a function of the periodicity of such pulses.

14. A method of investigating materials traversed by a well bore which comprises: probing with acoustic pulses, segments of constant length over a section of the bore, each of such pulses having a definite periodicity, generating sensible indications in response to such probing dependent upon the received acoustic energy of such pulses exceeding a given energy value, such indications having variations in time related to the acoustic velocities of the materials traversed by the bore, selectively altering the relationship between the given value and received acoustic energy for each successive acoustic pulse to determine the acoustic attenuation properties of the materials, generating other sensible indications in response to such altered relationship to indicate attenuation of the received acoustic energy, such other indications having variations in time related to the velocities of the materials modified by a time increment factor which is a function of the periodicity of such pulses.

15. A method of investigating materials traversed by a bore which comprises: probing with acoustic pulses, segments of constant length over a section of the bore by emitting acoustic energy and receiving acoustic energy at constantly spaced locations, each of such pulses having a definite periodicity, generating sensible indications in response to such probing dependent upon the received acoustic energy of such pulses exceeding a given energy value, such indications having variations in time related to the acoustic velocities of the materials traversed by the bore, selectively altering the relationship between the given value and received acoustic energy to determine the acoustic attenuation properties of the materials, and generating other sensible indications with such altered relationship to indicate attenuation of the received acoustic energy, such other indications having variations in time related to the velocities of the materials modified by a time increment factor which is a function of the periodicity of such pulses.

16. A method of investigating materials traversed by a bore which comprises: probing with acoustic pulses, segments of constant length over a section of the bore by emitting acoustic energy and receiving acoustic energy at constantly spaced locations, each of such pulses having a definite periodicity, generating sensible indications in response to such probing dependent upon the received acoustic energy of such pulses exceeding a given energy value, such indications having variations in time related to the acoustic velocities of the materials traversed by the bore, selectively altering the given value relative to the emitted acoustic energy to determine the acoustic attenuation properties of the materials, generating other sensible indications in response to such altered relationship to indicate attenuation of the received acoustic energy, such other indications having variations in time related to the velocities of the materials modified by a time increment factor which is a function of the periodicity of such pulses.

17. A method of investigating earth formations traversed by a borehole which comprises the steps of: periodically generating pulses of acoustic energy in a fluid filled borehole at spaced first locations along the borehole so that the acoustic energy generated passes through the fluid and into the formations with a velocity dependent upon the media through which it travels; intercepting at second locations regularly spaced from such first locations, each of the periodic pulses of acoustic energy and translating such energy into corresponding first electrical signals of alternating polarities, developing second electrical signals in response to the first amplitude of a given polarity of each of said first electrical signals which exceeds a given reference value, and developing an indication of first time intervals between the emission of a pulse and the time said second electrical signals are developed in response to each pulse, and altering the relationship between said given reference value and said first amplitude to obtain an indication of second time intervals which are related to said first time intervals by a function of the periodicity of the pulses.

References Cited in the file of this patent
UNITED STATES PATENTS

| | | |
|---|---|---|
| 2,137,985 | Salvatori | Nov. 22, 1938 |
| 2,190,686 | Slichter | Feb. 20, 1940 |
| 2,200,476 | Mounce | May 14, 1940 |
| 2,207,281 | Athy et al. | July 9, 1940 |
| 2,231,243 | Beers | Feb. 11, 1941 |
| 2,275,736 | Cloud | Mar. 10, 1942 |
| 2,522,433 | Dahlberg | Sept. 12, 1950 |
| 2,910,133 | Hudson et al. | Oct. 27, 1959 |
| 2,938,592 | Charske et al. | May 31, 1960 |